Sept. 19, 1939.  H. N. OTT ET AL  2,173,657
MEANS FOR ATTACHING MICROSCOPE OBJECTIVES
Filed Aug. 20, 1937
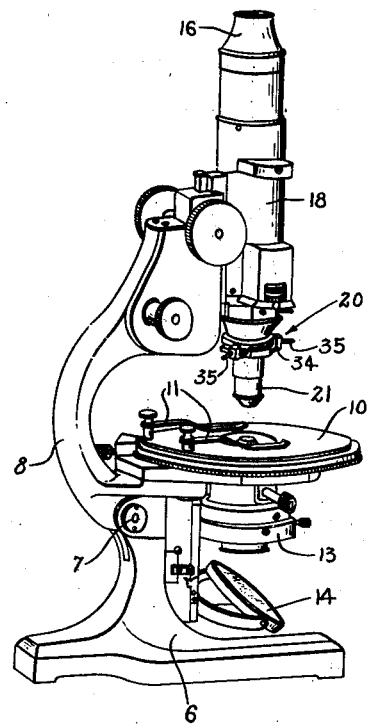
Fig. I
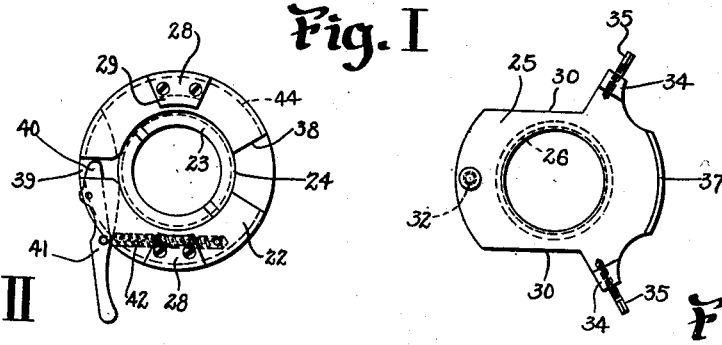
Fig. II    Fig. III
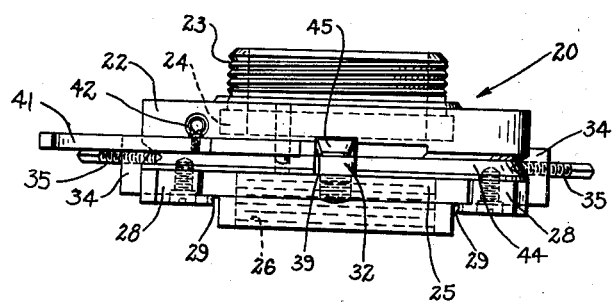
Fig. IV
INVENTOR
HARVEY N. OTT
GEORGE S. MACDONALD
BY Harry H. Styll
ATTORNEY Patented Sept. 19, 1939

2,173,657

UNITED STATES PATENT OFFICE 2,173,657

MEANS FOR ATTACHING MICROSCOPE OBJECTIVES

Harvey N. Ott and George S. MacDonald, Buffalo, N. Y., assignors to Spencer Lens Company, Buffalo, N. Y., a corporation of New York Application August 20, 1937, Serial No. 160,130

4 Claims. (Cl. 88—39)

This invention relates to means for attaching a microscope objective to a microscope in such a way that the objective may be quickly attached or detached, and may also be readily and accurately adjusted so that the center of the field of the objective coincides with a selected object on the stage of the microscope.

One object of our invention is to provide such an attachment for a microscope objective that centering is effectively and readily accomplished and at the same time the ease of removal of the objective so attached is not materially lessened.

A further object of our invention is to make sure that in such a mounting the fit is accurate, and that adjustment may be made with certainty while looking into the microscope.

In the accompanying drawing which illustrates our invention, Fig. I is a view in perspective of a petrographical microscope;

Fig. II is a bottom plan view of attachment means for supporting the microscope objective;

Fig. III is a top plan view of an adapter on the objective for cooperating with the attachment means of Fig. II; and Fig. IV is a view in elevation of the parts shown in Figs. II and III assembled in operative relation, Fig. IV being enlarged to approximately twice the scale of Figs. II and III.

For some uses of a microscope it is necessary to keep the optical axis of the objective accurately adjusted so as to keep the field carefully centered on a definite object. This is particularly true in investigations of crystalline material such as are carried on by petrographers.

In the accompanying drawing, we have illustrated by way of example a petrographical microscope. This instrument includes a base 6 to which is hinged at 7 an arm 8. The stage 10 is provided with spring clamps 11 for holding a slide or other object in position on the stage 10. A sub-stage 13 is provided with light by a reflector 14. These parts are not illustrated in detail, and indeed their specific construction forms no part of the present invention.

The optical system of the microscope including the ocular 16 is slidably supported on the arm 8, vertical adjustment being effected in the usual way. The lower end of the body tube 18 is threaded in the usual manner for attachment of means indicated in general by the numeral 20 for supporting an objective 21. For ease of identification we term the attachment means a carrier, this carrier cooperating with an adapter on the objective 21. For clarity of illustration, the carrier is shown in Fig. I so oriented on the body tube 18 that the adjustment parts are seen. We prefer, however, the arrangement in which these parts are turned to the front of the microscope and the means 20 for supporting the objective goes into place from in front. In the drawing, the carrier and the adapter are illustrated in Figs. II and III, respectively.

The carrier is fixed relative to the body tube 18 whereas the adapter may be shifted laterally so as to bring the optical axis of the objective 21 into accurate alignment with a definite object on the stage of the microscope. The required adjustment for thus centering the objective is afforded by the three-point contact between the carrier and adapter which will later be described in detail.

Referring to Figs. II and IV it will be noted that the means of attachment to the microscope for supporting the objective, and termed for convenience the carrier, comprises a block 22 which is centrally bored to accommodate a collar 23 having on its exterior the standard thread by which a microscope objective is attached to a microscope. An external flange 24 at the lower end of the collar 23 serves for clamping the block 22 against the lower end of the body tube 18.

The adapter 25 which cooperates with the block 22 has a central bore threaded at 26 for receiving the threaded upper end of the objective 21. It is apparent from Figs. III and IV that the adapter is essentially a plate which when positioned beneath the carrier block 22 is slidable laterally relative to the axis of the microscope.

To the bottom of the carrier block 22 are secured a pair of guides 28 having flanges 29 along their inner lower edges (see Figs. III and IV). The adapter 25 is cut away along its opposite edges 30 so as to slide in on top of the flanges 29. As is apparent from Fig. IV there is sufficient play at the two sides of the adapter so as to provide for the desired adjustment in centering the objective. The flanges 29 serve to support the adapter and accordingly the objective in approximate position, the accurate centering being accomplished by means of the three-point contact above-mentioned and which will be now explained in detail.

A pin 32 projects upwardly from the adapter adjacent one end thereof; and a pair of lugs 34 which stand up from corners of the adapter carry adjustable contacts or stops in the form of set screws 35. The lugs 34 are slit so that the set screws 35 are to some extent clamped in adjusted position. An upstanding flange 37 at the opposite edge from the pin 32 prevents the adapter from moving in too far when the adapter is inserted and also covers an opening 38 in the carrier block 22. This opening 38 is provided in the carrier 22 for permitting the pin 32 to move clear of the carrier. On the opposite side of the carrier block 22 is a slot 39 into and out of which swings the end 40 of a lever 41 which is biased by a tension spring 42 so as to afford a yieldable contact which cooperates with the pair of set screws 35 so as to center the objective. The slot 39 is a fairly close fit for the pin 32. This pin is admitted to the slot through its inner end by swinging the lever 41 in a clockwise direction as viewed in Fig. II until the nose 40 of the lever is clear of the slot 39. After the pin 32 has passed the nose 40, the lever 41 is released and the spring 42 pulls or draws the pin 32 along the slot 39 so as to yieldably draw the adjustable stops 35 into engagement with the carrier block 22.

Adjustment of the position of the objective is accomplished with remarkable ease with this construction of mount for the objective. Referring to Fig. III the three-point contact, above referred to, is clearly apparent. If the center of the field is apparently too far to the left when looking into the microscope, referring to Fig. III, both of the set screws 35 will be screwed inwardly. If, on the other hand, the center of the field is too far to the right, the two set screws 35 are backed out. If it is desired to shift the objective upwardly referring to Fig. III, the upper set screw 35 is backed out, and if necessary some slight adjustment of the bottom set screw 35 is effected. The opposite is true if it is desired to move the center in the opposite direction. The observer has the important advantage of observing the field all the time that he is making the adjustments above referred to. In this way he is able to bring the desired point accurately to the center of the field with rapidity and ease. The yieldable contact 40 merely establishes the correction which is effected by the other two stops 35, 35.

In order to firmly hold the adapter 25 against the bottom surface of the carrier block 22, we arrange each of the three contacts so that its bearing is against a beveled surface. The two set screws 35 engage the lower level of a groove 44 in the periphery of the block 22 and, therefore, the tendency is for the bearing points of the set screws 35 to move upwardly as they are drawn inwardly against the beveled surface of the groove 44. The third contact is between the pin 32 and the nose 40 of the lever 41. As illustrated by Fig. IV, we provide the pin 32 with a downwardly tapered head 45; and accordingly, as the nose 40 presses against this head the latter tends to move upwardly and draw the adapter 25 into snug engagement with the bottom face of the carrier block 22.

Fig. II shows the rounded nose 40 of the lever 41. This rounded nose acts as a cam against the pin 32 to push it sidewise and so tend to push it against the side of the slot 39. As the side of the slot 39 is on a fixed part of the microscope, namely the carrier 22, the pin 32 is returned by the action of the nose 40 to precisely the same point whenever the objective is detached and again attached to the microscope. Thus, there is the freedom of a slot with plenty of clearance for insertion of the adapter with its pin 32, yet the accuracy of positioning which a fixed and constant rest for the pin 32 assures. Moreover, while centering the objective, the pin is not free to wobble about in the slot 39 but travels, if indeed it has any travel, along the side wall of the slot 39.

Accordingly, our arrangement for centering the objective is particularly advantageous in that the lever 41 affords a spring tensioned pull to bring the adjustable stops, i. e. the set screws 35, against the carrier 22. Moreover, the beveling of the pin head 45 and of the groove 44 tends to bring the adapter into snug engagement with the bottom of the carrier 22. And furthermore, the cam action of the rounded nose 40 causes accurate positioning of the pin 32 under the tension of spring 42.

It will be apparent from the above description that we have provided an attaching means for a microscope objective which affords a simple and accurate adjustment of the carrier whereby centering of the objective is made easy and rapid.

While we have illustrated and described a preferred embodiment of our invention it will be understood that the invention may be otherwise embodied and practiced within the scope of the following claims.

We claim:

1. Means for interchangeably attaching an objective to a microscope comprising a coupling composed of a carrier member to be secured to the microscope and an adapter member to be secured to the objective, one of said members having a transverse guideway thereon and the other having guide means to be loosely disposed in said guideway to initially position said members in relation with each other, one of said members having spaced adjustable contacts adjacent one end of the guideway, when the said members are assembled, and the other having relatively fixed abutment means to be engaged by said contacts, one of said members having pin-like means thereon adjacent the opposite end of the guideway, when said members are assembled, and the other having attachment means for engaging said pin-like means to exert a biasing pressure thereon in a direction which will press the said spaced adjustable contacts into engagement with the abutment means with the said contacts and pin-like means so disposed relative to each other as to provide a three point suspension of one of said members relative to the other whereby the axis of said objective may be located in desired relation with the axis of the microscope by adjustment of said contacts.

2. Means for interchangeably attaching an objective to a microscope comprising a coupling composed of a carrier member to be secured to the microscope and an adapter member to be secured to the objective, one of said members having a transverse guideway thereon and the other having guide means to be loosely disposed in said guideway to initially position said members in relation with each other, one of said members having spaced screw-like contact members adjacent one end of the guideway when the said members are assembled and the other having relatively fixed abutment means to be engaged by said contact members, with one of said members having pin-like means thereon adjacent the opposite end of the guideway, when said members are assembled, and the other having spring pressed attaching means for engaging said pin-like means to exert a biasing pressure thereon in a direction which will press the said contact members into engagement with the abutment means with the said contact members and pin-like means so disposed relative to each other as to provide a three point suspension of one of said members relative to the other whereby the axis of said objective may be located in desired relation with the axis of the microscope by adjustment of said screw-like contact members.

3. Means for interchangeably attaching an objective to a microscope comprising a coupling composed of a carrier member to be secured to the microscope and an adapter member to be secured to the objective, one of said members having spaced adjustable contacts adjacent one side thereof and the other having relatively fixed abutment means provided with angularly disposed face portions to be engaged by said contacts, one of said members having pin-like means adjacent the side thereof opposite the contacts, when the said members are assembled, said pin member having a side surface tapering outwardly to an enlarged end portion and the other having a pivoted latch member thereon with the latch portion so positioned as to engage the tapered side of the pin when the contacts are in engagement with the angularly disposed face portions of the abutment means, said latch member having spring means associated therewith for exerting a biasing pressure on said latch member in a direction which will press the said spaced adjustable contacts into engagement with the angularly disposed face portions with the said contacts and pin-like means so disposed relative to each other as to provide a three point suspension of one of said members relative to each other whereby the axis of said member may be located in desired relation with the axis of the microscope by adjustment of said contacts.

4. Means for interchangeably attaching an objective to a microscope comprising a coupling composed of a carrier member to be secured to the microscope and an adapter member to be secured to the objective, one of said members having spaced adjustable contacts adjacent one side thereof and the other having relatively fixed abutment means provided with angularly disposed face portions to be engaged by said contacts, one of said members having pin-like means adjacent the side thereof opposite the contacts when the said members are assembled, said pin member having a side surface tapered outwardly to an enlarged end portion and the other having a spring pressed lock member thereon with the said lock member so positioned as to engage the tapered side of the pin when the contacts are in engagement with the angularly disposed face portion of the abutment means, said spring pressed member exerting a biasing pressure on said pin member in a direction which will press the said spaced adjustable contacts into engagement with the angularly disposed face portions with the said contacts and pin-like means so disposed relative to each other as to provide a three point suspension of one of said members relative to each other whereby the axis of said objective may be located in desired relation with the axis of the microscope by adjustment of said contacts, the angularly disposed face portions and the tapered side of the pin being so disposed that when the contacts are biased toward said face portions the said carrier member and adapter will be urged into relatively intimate relation with each other.

HARVEY N. OTT.
GEORGE S. MacDONALD.